(12) United States Patent
Gottlieb

(10) Patent No.: US 8,696,116 B2
(45) Date of Patent: Apr. 15, 2014

(54) METHOD AND APPARATUS FOR TREATING VISION NEGLECT

(76) Inventor: Daniel D. Gottlieb, Sandy Springs, GA (US)

( * ) Notice: Subject to any disclaimer, the term of this patent is extended or adjusted under 35 U.S.C. 154(b) by 39 days.

(21) Appl. No.: 13/231,700

(22) Filed: Sep. 13, 2011

(65) Prior Publication Data

US 2012/0062838 A1     Mar. 15, 2012

Related U.S. Application Data

(60) Provisional application No. 61/382,235, filed on Sep. 13, 2010.

(51) Int. Cl.
*G02C 7/14*     (2006.01)
(52) U.S. Cl.
CPC .......................................... *G02C 7/14* (2013.01)
USPC ................................. 351/159.73; 351/159.58
(58) Field of Classification Search
USPC ............. 351/159.73–159.81, 159.58–159.59
See application file for complete search history.

(56) References Cited

U.S. PATENT DOCUMENTS 4,779,972 A * 10/1988 Gottlieb ................... 351/159.19
7,789,508 B2 * 9/2010 Padula et al. ............ 351/159.58

OTHER PUBLICATIONS

National Institute for Rehabilitation Engineering, Vision Aids for People Having Homonymouis Hemianopsia,1-6; Jan. 2002.*

* cited by examiner

*Primary Examiner* — Scott J Sugarman
*Assistant Examiner* — Robert E Tallman
(74) *Attorney, Agent, or Firm* — Russell L. Sandidge

(57) ABSTRACT

A method and apparatus for aiding the vision and motor function of an individual with a visual field loss and the sensory imperceptions of visual neglect. The method is practiced by the steps of mounting one or more prisms with the bases most often in the same direction of the visual field loss within one or both lenses of a pair of glasses and an individual wearing the glasses even while in coma or sleeping.

20 Claims, 7 Drawing Sheets

METHOD AND APPARATUS FOR TREATING VISION NEGLECT

This application claims the benefit of U.S. Provisional Application No. 61/382,235, filed Sep. 13, 2010, the entire contents of which are incorporated herein by reference.

BACKGROUND OF THE INVENTION

This application relates to the field of rehabilitation of individuals suffering from a visual field loss and the sensory imperceptions of visual neglect. More particularly, this invention relates to improved methods of treating patients with visual and perceptual losses by using lens systems directly in front of the line of sight incorporating prisms.

SUMMARY OF THE INVENTION

The present invention is an improved method of using prisms to treat individuals suffering from visual field loss and visual neglect. This new method will allow for functional improvements as compared to previous treatment methods. The basis for utilizing the work in the hospital and clinical practice of medicine is created by understanding the brain injury and predicting the most probable visual, sensory and motor consequences. Individuals in coma within the ICU are provided this technology so they awaken to a more normalized visual spatial picture. An individual's posture will frequently show the protective reflexes that further point to the nature of the brain injury and expected vision and motor loss. Objective measures of change are measurable by quantitative electro encephalogram (QEEG). The same objective measures would be visible through functional magnetic resonance imaging (FMRI).

The method incorporates the use of one or more small, wedge shaped prisms mounted within a single carrier lens or within a frame of a spectacle. The prism may be mounted to project inside or outside of a spectacle born single vision or multifocal prescription. Our clinical studies indicate that an 18.5 prism diopter prism is optimum, but that the prism may advantageously be in the range of 5 to 35 prism diopters. Such a prism has exceptional optics without the severe spatial distortion and reduced resolution characteristic of the Fresnel press-on prisms.

A lens system to be used in the invented method may also be designed so that a prescriptive lens button can be placed in apposition to the prism or the prism may be surfaced to itself have power. This ensures that the patient has not only the prism effect, but also the appropriate spectacle correction for distance or near viewing through the prism(s).

The prism is placed in the line of sight of the individual. By placing the prism in the line of sight it is visible on straight ahead gaze. By viewing through the prism (with its base in the direction of the visual field loss) a more full field of vision is created in a patient with two seeing eyes. A superimposition takes place in the occipital visual cortex of the brain due to the shifted visual images. The image seen through the prism by one eye is projected over the other eye's visual field. The useful field of view increases as the individual learns how to increase the visual space with increasing divergence of the patient's eyes. Thus, prism system is used as a functional full time system for awareness, and as a system used for viewing a more full visual space on an extended basis. Some individuals report some doubling of the superimposition, but most experience and enthusiastically welcome the increased viewing field and do not report doubling or confusion of the images.

Furthermore, the choice of right or left lens to hold the prism may be dependent on additional individual characteristics. For instance, a person with strabismus is one who has only one eye capable of habitually fixating on the intended object. If the non-fixating eye of such a person is the eye nearest the side of visual field loss, it will be necessary to place the prism in the lens of the better fixating eye. The prism will be mounted with base of prism nasally (non-temporally), so that the prism is in front of the better fixating eye, but in this instance not in the direction of the visual loss.

Therefore, it is an object of the present invention to provide a method of improved treatment of visual field loss and visual neglect in which a prism mounted within a lens is used by patients with such losses.

It is a further object of the present invention to provide a method of using prisms mounted within a lens, which includes means for refractive vision correction of the images seen through said prism.

It is yet another object of the present invention to provide a method of treating visual field loss and the visual imperceptions that are cosmetically acceptable.

These and other objects and advantages of the present invention shall become apparent from the following detailed descriptions of the invention when considered in conjunction with the accompanying drawings.

DETAILED DESCRIPTION OF THE PREFERRED EMBODIMENTS

Figure 1:
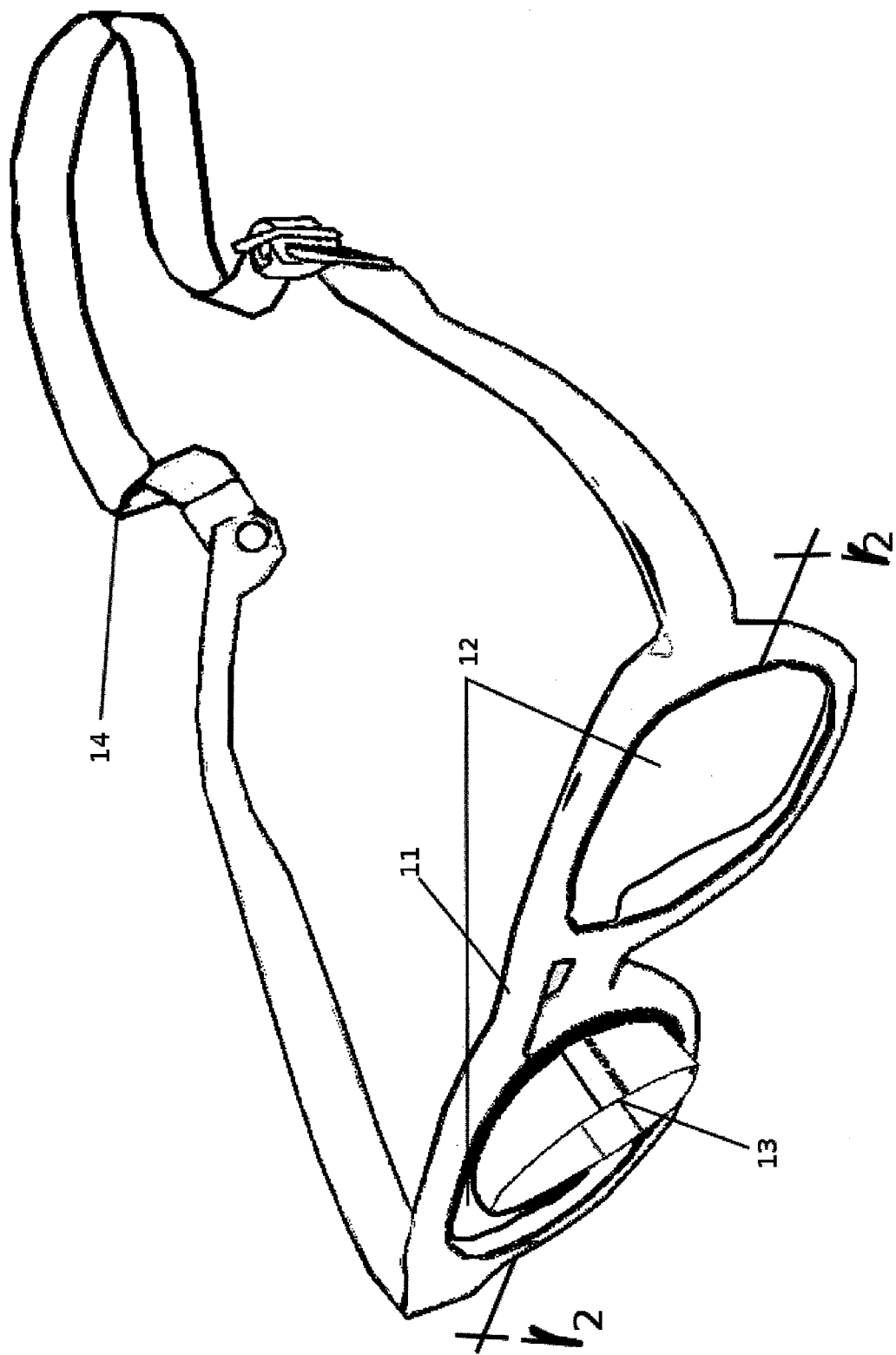
FIG. 1 is a perspective view of a lens system as utilized in the method of the present invention.
Figure 2:
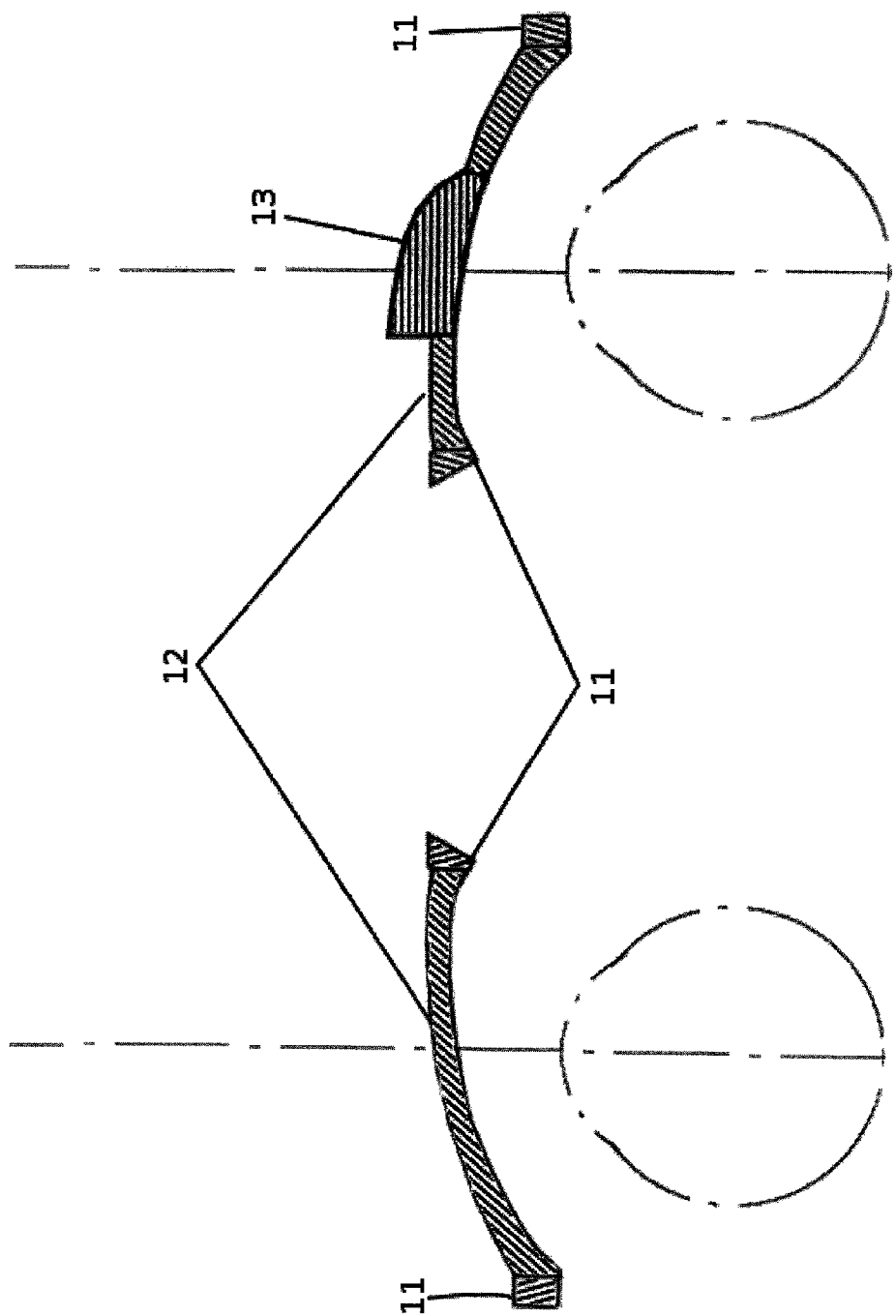
FIG. 2 is a cross-section taken along the lenses of FIG. 1.

The invented method and apparatus is now described in detail with reference to the drawings, wherein like numbers represent like parts throughout the views:

This application is for a method and apparatus for the treatment of visual loss, "visual neglect," and other applications as described below. This innovative method prevents the lifelong disability from brain injury, including stroke and trauma, including lessening or eliminating the paralysis and spasticity known as hemiplegia. The innovative use of prisms enables an individual to awaken, even from a state of coma, to a visual perception of near normalcy.

Visual neglect has been recognized for years as an impairing consequence of stroke and traumatic brain injury. The spatial imperceptions commonly called visual neglect are frustrating to individuals and all professionals. The motor paralysis will usually last a lifetime and takes an individual from being a productive member of society to disability within seconds of an insult. The visual neglect interferes with the rehabilitation effort, compromising outcomes. The visual neglect interferes with every available therapy, including occupational therapy, physical therapy, and speech therapy. The individual's lack of spatial awareness to the side of visual and perceptual loss creates an obstacle to the vision rehabilitation effort. The emotional costs to the individual and family facing the insurmountable obstacle of visual loss with and without visual neglect are immeasurable.

When an individual has vision loss without visual neglect he has lost a part of his visual field and is aware of it. When walking he may use a white cane to avoid bumping into objects. Placing hands out to the sides of the body helps to feel for the wall, a chair, or the doorknob. However, with visual neglect in combination with vision loss the brain cannot compute having this loss. Using a white cane doesn't work when the brain cannot realize the loss of awareness. The chance of falling and being injured is great with visual neglect because the brain doesn't realize that it is not seeing. It is possible to have visual neglect without measurable vision loss. The described prism technology and method are able to trick the brain so that a person can recognize his loss and deal with it.

Immediately following brain insult it is recommended that the device be utilized. The device may be utilized in the intensive care unit (ICU) to enable a patient to awaken with a more normalized visual perception. The technologies of CT, MRI, and other FMRI neurological measures will enable a determination of whether there will be left or right visual and motor loss as well as being able to predict neglect in the unconscious patient. This will enable the body and the brain to perceive that it has not been injured and prevent, outside of voluntary control, the mal-adaptation to the insult. The method is also useful for restoring vision for individuals who have vision loss. For those with hemianopsia, the method helps to fill in the missing space leading the brain to realize that improvements are possible. For such an individual, without a history of visual neglect, the technology is useful in the vision rehabilitation effort to drive an increased perception expanding and filling in the missing space.

Vision is a guiding force signaling the brain and body that an individual has been hurt. The protective mechanisms, out of voluntary control, must not be allowed. The body's own mechanism for protection and self-healing must be prevented. The brain recognizes it has been hurt and signals the spinal cord to send messages to the injured limbs creating aberrant regeneration. The aberrant regeneration is an unorganized neuro-motor response which creates the extreme spasticity and paralysis known as hemiplegia. By telling the brain it is okay, the brain and spinal cord do not signal the body to initiate protection mechanisms and abnormal posturing. Using the present method guides the neuro-plasticity and facilitates an organized neurological response to injury.

Reading with hemianopsia is an insurmountable obstacle following stroke or trauma. Non-optical reading guides are of limited value. Yoked prism glasses, with bases in the same direction, are described in the medical literature to be of limited success for reading.

The fabrication of prism within or on a carrier lens is possible using various methods. Also, a combination of methods may be used, including grinding specific prism powers. For some applications, two separate prisms may be used in order to obtain the correct powers for providing the prism as well as refractive conditions. Sometimes only one prism of, for example, 18.5 prism diopters is created. The prism can be mounted within a carrier lens that is drilled to the exact specifications to enable a safe mounting. Some prisms of lesser powers may be fabricated by grinding the prism into the final prescription incorporating both prism and refractive requirements. Fabrication in the optical industry includes the steps of laying out, surfacing, polishing, edging and finishing. It can also include the steps of drilling the carrier lens and mounting by glue of the prism within the carrier lens. These various methods of fabrication are all known in the art.

Preferably, there may be four phases to the method and the use of the system. Not every individual will require all four phases, although the most severely impaired will require all four phases. Individuals in the ICU will benefit from awakening with the device in Phase I already in place on the patient. Phase I prescriptions will help prevent the loss of motor function and years of disability from the paralysis of brain injury. Phase II through Phase IV for a patient enables increasing function and perceptions at each increasing step. Refractive prescriptions can be incorporated for any individual wearing glasses or contacts by reviewing eye records. For a right brain injury, the neurologist or ICU hospitalist would select a prescription for left side visual, sensory and motor loss. The prevention of visual perceptual and motor loss begins when the eyes open after a coma, stoke or other trauma. That moment of visually awakening, whether in 24 hours or 2 years, must happen while viewing through the lenses of the device. Once the individual is standing or walking, Phase I may involve some doubling of vision. Frequently, within the space of a hospital room the individual will not experience double vision. The goal of Phase I is for the initial device prescription to be eventually rejected. It may be rejected in minutes if the individual is without vision loss, or perhaps within 24 hours if effective. The sooner it is effective, the more likely it will be rejected. The most injured patients are the ones likely to require Phases II, III, and IV.

Separate prescriptions for reading and walking may be useful. The final prescription increasing sensory field awareness at near may be the Phase IV prescription with refractive prescription for the tasks and working distances. An individual who has suffered vision loss and is recovering from that loss at his or her level of function might choose to go directly to the Phase IV prescription.

FIG. 1 shows a lens system used in the present invention. As illustrated in FIG. 1, a prism is also located for straight-ahead vision of the right eye. The prism 13 is mounted outside the lens to allow sleeping with the prescription and for wearing 24 hours/seven days per week. A soft frame 11 with outside mounting of the prism 13 allows the system to be utilized safely for a patient in a coma before awakening. The soft frame 11 has a strap 14 allowing the prescription to hold in place when an individual rolls over while sleeping. Soft frames are available, for example, from Mira Flex, 1421 Courtyard Drive, San Jose Calif. 95118, 866-647-2359 (Sport Look), or from Solo Bambini, 1156 Howard Ave Suite A, Burlingame Calif. 94010, 650-340-1773 (Eagle Scout).

A thinner design is created by physical composition to create a thin uniform prism 13 without flattened areas, allowing for full viewing, and is mounted within one of the carrier lenses 12. Although the prism 13 shown is circular, it may be rectangular or other shapes. Furthermore, it should be large enough to allow for a more normal visual field while viewing through the lens and not around the prism. Although multiple prisms may be placed in a single lens if necessary for different visual requirements, such a design will be infrequently prescribed.

For the individual with two eyes of normal acuity, but with vision loss, the purpose of the prism 13 is to shift a portion of the visual field which lies in the direction of the prism's base into direct view through the prism. The lens system is used in the present invention to be an aid for individuals who have lost the ability to see a full visual field. By appropriately placing the prism directly in the line of sight when viewing straight ahead, that portion of the visual field of visual loss is brought into view. By placing only one such prism in one lens, a whole visual space is created of the field seen through the prism. Individuals with visual field loss will adjust visually to any superimposition of vision caused at the edges of the superimposed visual fields viewed through each eye by viewing into the prism.

The prism may be of any standard material, shape, and power. Most often it will be circular in shape and drilled within a carrier lens prescription. The prism could be corrected for refraction for distance or near. It is designed for wearing 24/7 until the patient reports that the prism is a nuisance or the medical team documents that the patient is now seeing. The individual in a rehabilitation center shall wear the device until the prescription has done its job of awakening visual perception and breaking through the severely impairing visual spatial neglect. The technology, frame and lenses, can be used in a swimming pool and is useful for aquatic therapy reaching levels of movement not previously achievable. The device is also beneficial for those that have a previously described visual neglect who have residual functional impairments. While the configuration shown in FIG. 1 is for an individual with a left visual field loss, the placement of the prisms may be adjusted for a right or latitudinal field loss by appropriate placement with the base of the prism in the direction of the field loss.

FIGS. 2-5 also show that the prism 13 is located through the lens 12. This placement of the prism within a lens may be accomplished by methods known in the optical lens manufacturing art. The base of the prism 13 is also directed toward the visual field loss to bring objects located within the area of visual loss into direct view, creating a full visual viewing space. The prism 13 in FIGS. 2-5 can be mounted so that it projects inward with flush front mounting so the prism is in the same plane as the carrier lens. The prism 13 is placed directly in the line of sight of the individual's visual field when looking straight ahead. By viewing on straight ahead gaze the individual can view through the prism creating a functional wider whole visual space and enabling the individual to see the visual field to the left. The design of the prism 13 may allow for a power lens button providing a power correction, for instance for near-sightedness, so that the shifted image in the prism is also in focus and seen clearly. An alternative implementation for providing vision correction is to directly grind the prism 13 so that the correction is provided directly in the prism. In that case, the lens system would appear the same as in FIGS. 2-5.

Figure 3:
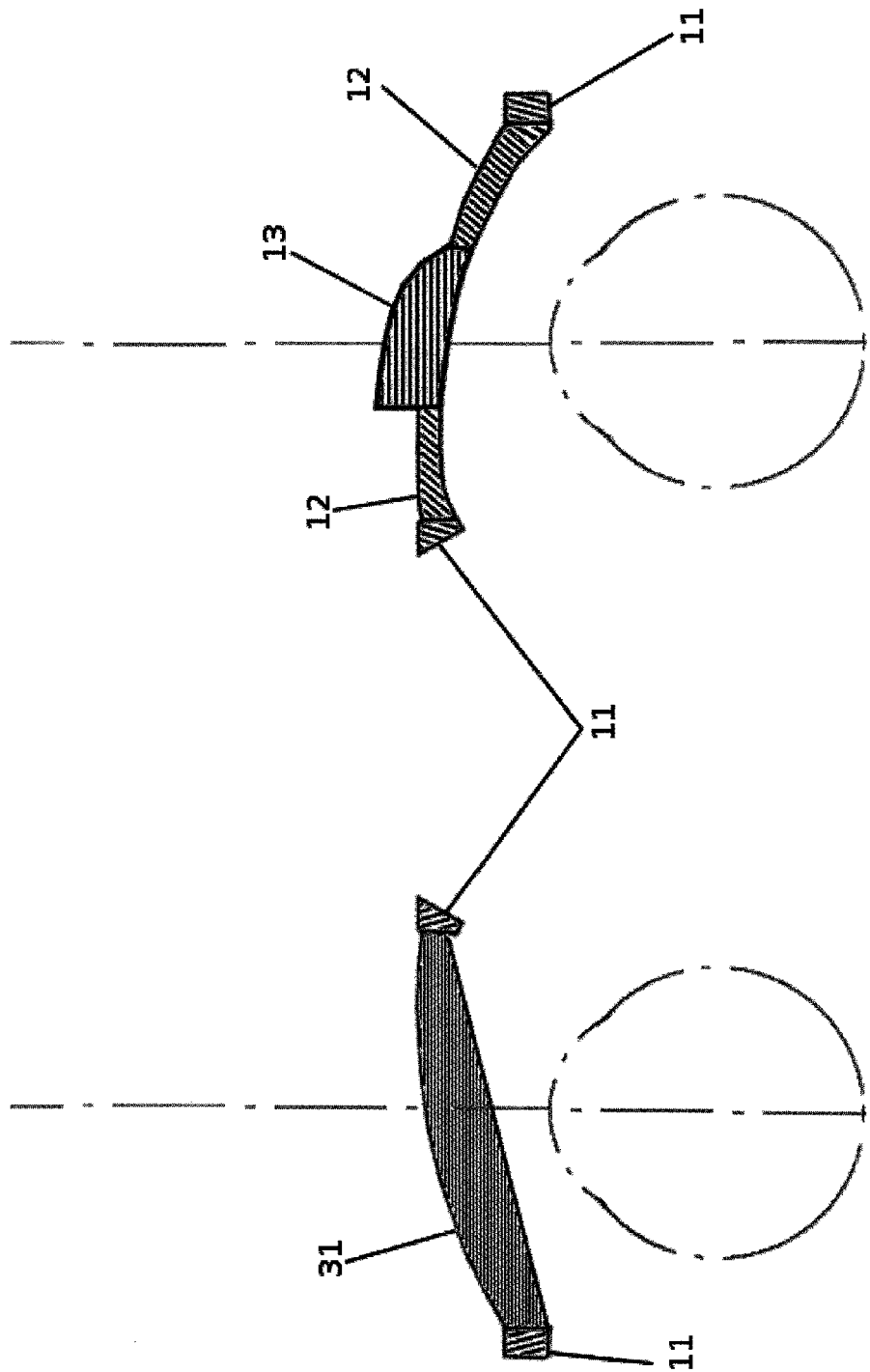
FIG. 3 is a cross-section taken along the lenses in FIG. 1, showing an externally projecting prism mounted in the right lens and the left lens is a prescription lens.
Figure 4:
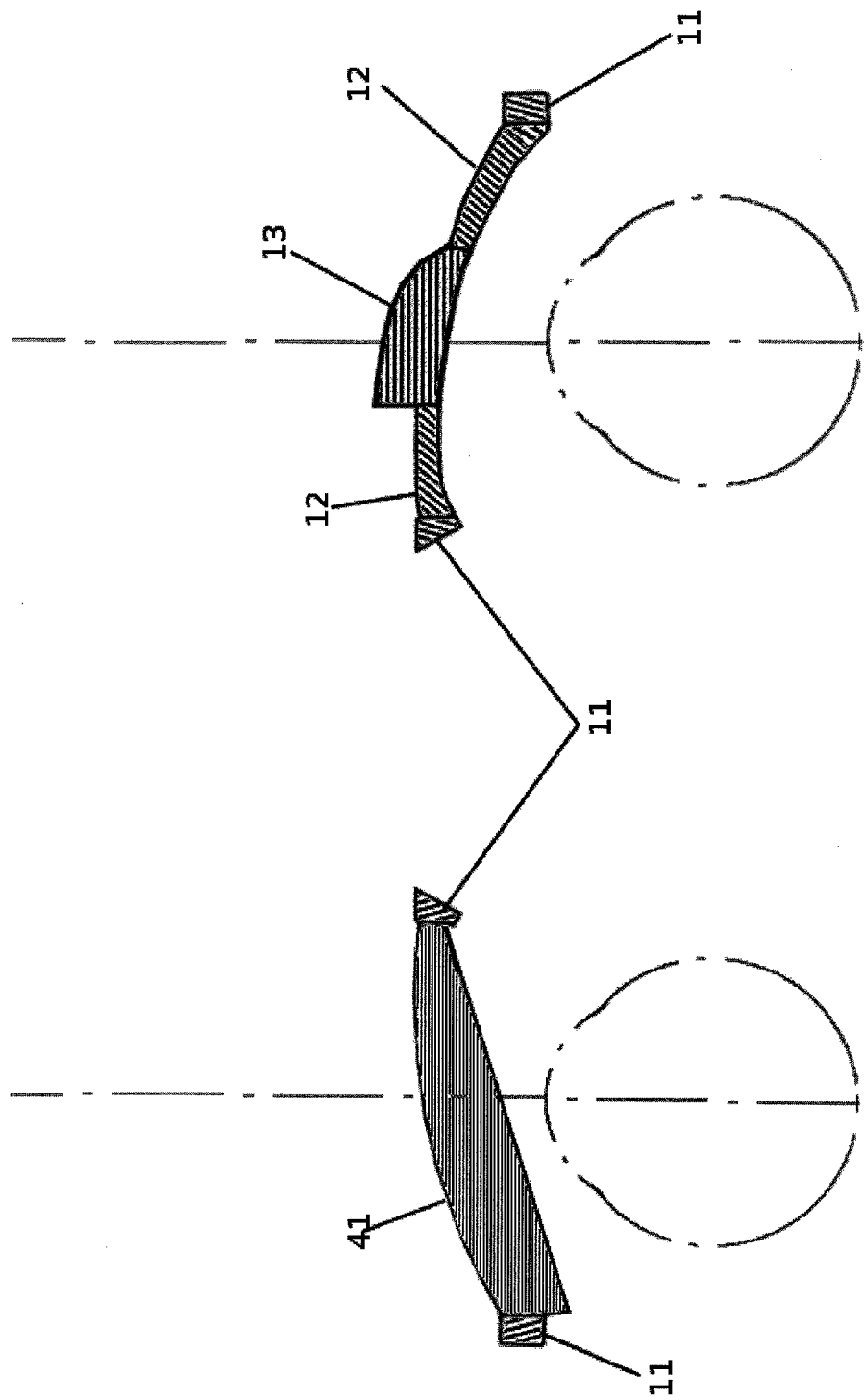
FIG. 4 is a cross-section taken along the lenses in FIG. 1, showing an externally projecting prism mounted in the right and the left lens is a prescription in lens with a different prescription closest to visual field loss.
Figure 5:
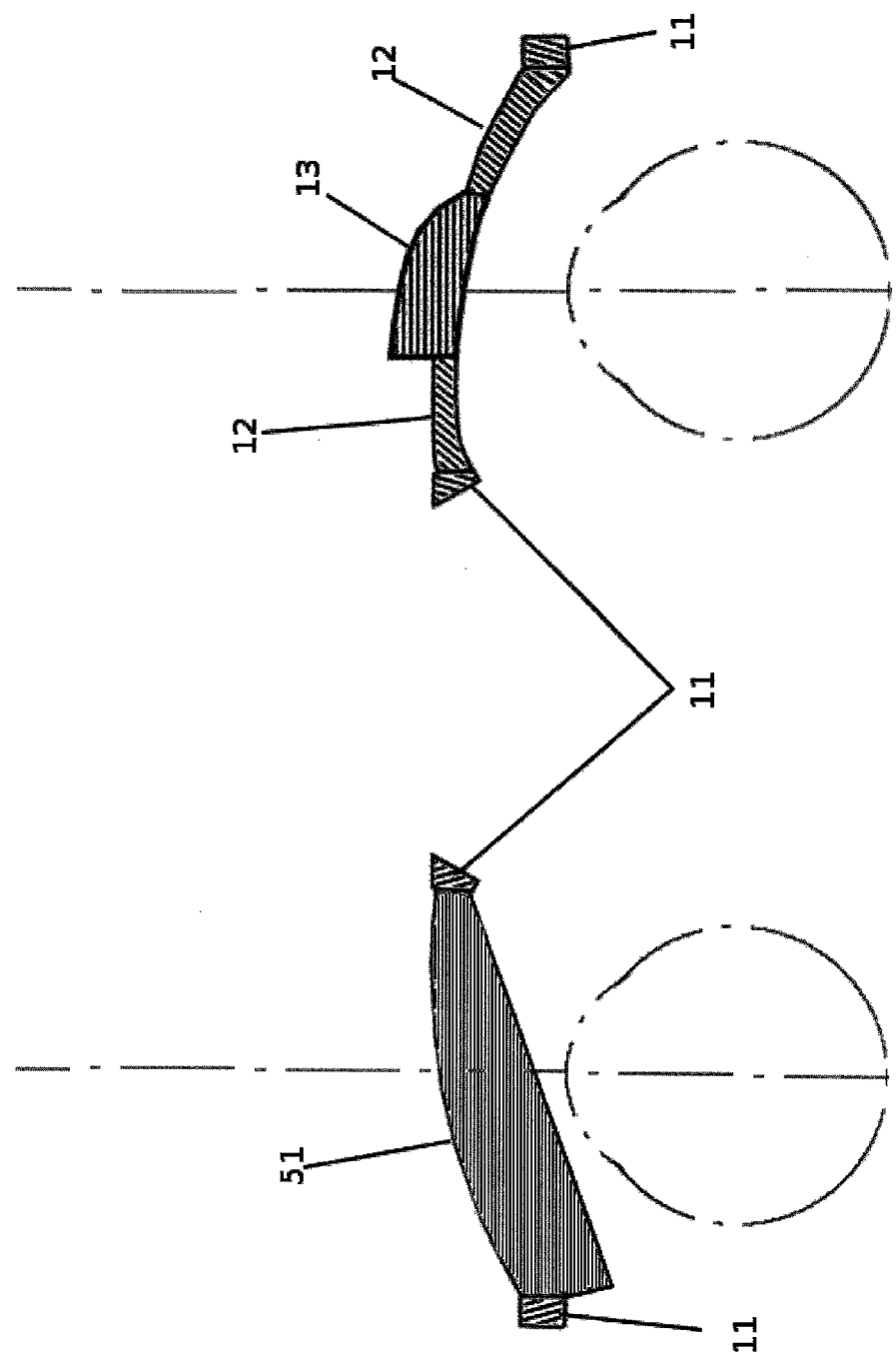
FIG. 5 is a cross-section taken along the lenses in FIG. 1, showing an externally projecting prism mounted in the right and the left lens is a prescription with a further different prescription.

In alternative designs, the prism 13 in the lens 12 may be in front of the line of sight of the left eye. Such an arrangement is desirable when the individual has one better fixating eye, which is not the eye closest to the direction of the visual field loss, such as an individual with strabismus or amblyopia. In this case, the prism 13 should be placed in the lens 12 in front of the fixating eye and the prism 13 will be placed in the direct line of vision with the base nasally, and in this situation with the prism base away from the direction of visual loss. The prism 13 may be placed in the lens 12 such that it projects to the inside of the lens. Such an internal projection of the lens may be accomplished wherever the prism is placed, with the same desirable effects. The internal placement of the prism results in significant improvement in cosmetic appearance, which will result in increased acceptance by the individual of the lens system of the present method. In addition, the internal mounting allows the most unobstructed view of the visual field. The configurations of FIGS. 2-5 demonstrate the progression of invention from Phase I in FIG. 2 to Phase IV in FIG. 5. FIG. 3 shows an externally projecting prism 13 mounted in the lens 12 farthest away from the visual field loss and a Phase II prescription in the lens 12 closest to visual field loss. FIG. 4 shows an externally projecting prism mounted in the lens 12 farthest away from the visual field loss and a Phase III prescription in the lens 12 closest to visual field loss. FIG. 5 shows an externally projecting prism mounted in the lens 12 farthest away from the visual field loss and a Phase IV prescription with a prism of largest value in the lens 12 closest to visual field loss.

EXAMPLE

The following is an example of the prisms used in progressive phases, where the powers of the prisms are expressed in diopters, and BI stand for "base in" and BO stands for "base out". The first column shows that the same power prism (18.5 diopter) is used for the eye farther away from the visual field loss, and the second column shows the power or the prism for the other eye.

| | |
|---|---|
| Phase I 18.5 BI | no prism in opposite eye |
| Phase II 18.5 BI | 4.5 BO opposite eye |
| Phase III 18.5 BI | from 8.5-10 BO opposite eye |
| Phase IV 18.5 BI | 14 BO opposite eye |

Increasing divergence is the key to moving from Phase I through Phase IV. As divergence of the individual improves, the individual becomes more capable of controlling and widening his useful field of vision. This happens both willfully and as needed.

Figure 6:
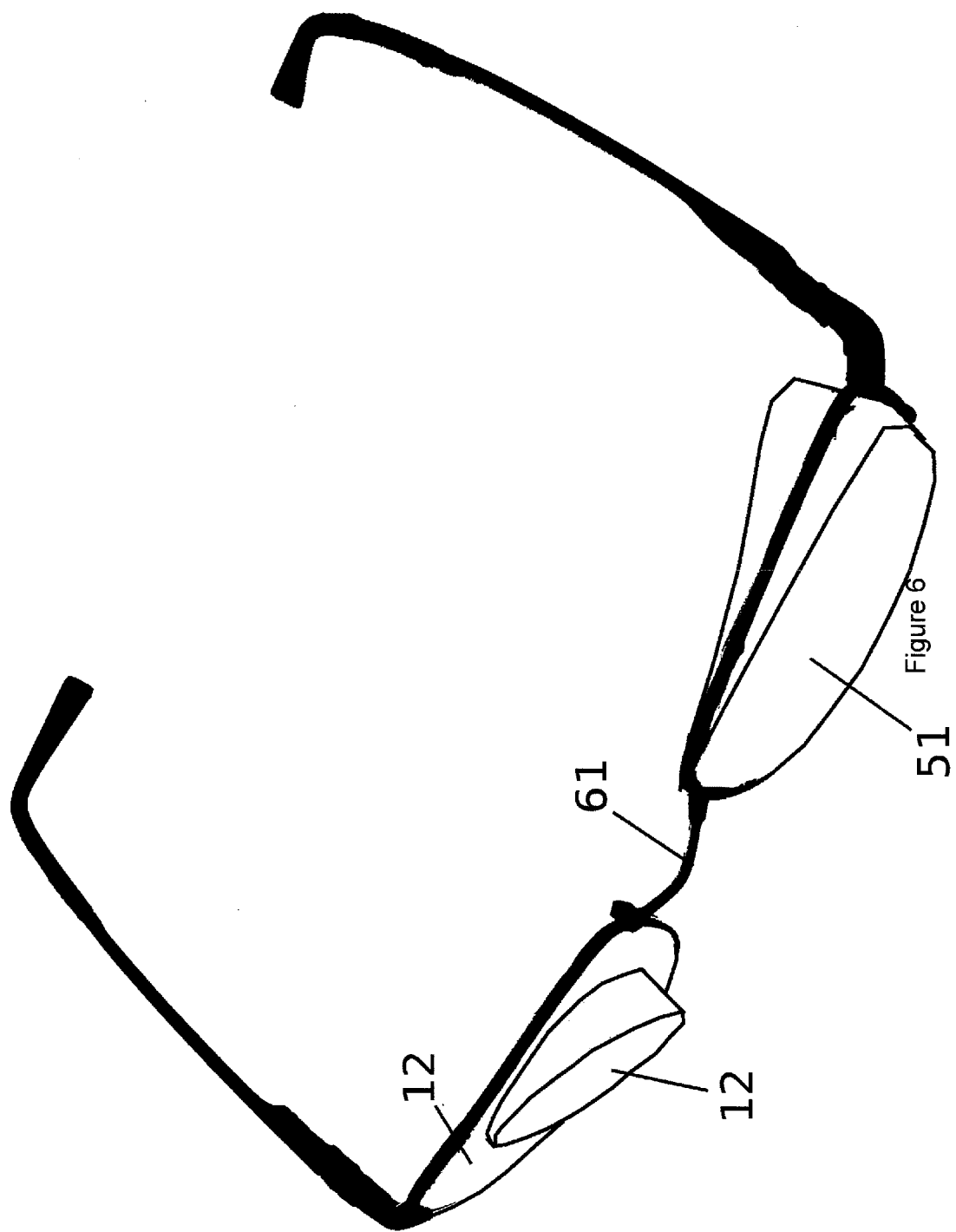
FIG. 6 is a perspective view of a lens system as utilized in the method of the present invention with unequal prisms in both lenses.

The location of the prism of stronger power is important so that it is appropriately placed to best accommodate each individual's field loss. In the most common circumstance the prism will be located in the lens furthest from the direction of visual field loss. Thus, the placement of the stronger prism 12 shown in FIG. 6 with, in some cases, a prism 51 of lesser power for the other eye is typical of a lens system used for an individual with a left vision field loss using a prescription mounted in a hard frame 61. The difference between the prism powers is very important. The difference allows the visual system to be in dynamic state of seeing vs. when the images are shifted with prisms of identical power. The prism 51 can be ground to the full dimension of the frame because it is of lesser power. The prescriptions may have an enhanced cosmetic aspect of the system with flush front mounting and prism internally mounted when possible.

The frame can also hold prism lenses of various powers utilized for specific reading glasses or other near vision uses. The prism power is also able to be incorporated into a final spectacle prescription. Reading with hemianopsia is frustrating and nearly impossible. Increasing the field of useful vision immediately provides a wider visual field. Individuals suffer for years with limited reading abilities. Using this method and apparatus, some individuals report a normal full field of view at near vision, such as for reading and using a computer. An individual with left vision loss could receive a prescription such as a prism power of 4 Base In, usually before the eye opposite to the visual field loss. The individual might also read better with a 6, 8, or 10 Base In prism. At some point the prism may cause superimposition and confusing images. Finding the best prism power can be determined with known tests or simply with the text of interest to an individual.

The most common powers of 4, 6 and 8 can be utilized in the final prescription. Usually, the power is less than 18.5, but in some cases more power may be use to facilitate reading and movement, so that the range of power could be between 0.25 and 45. The perceived expansion of visual space is helpful functionally, for movement as well as reading.

For individuals with presbyopia who require corrective lenses for reading or near vision, reading powers, such as in the range of +0.75 to +3.0, as would normally be prescribed, can be included in the method and device by incorporating the correction into the prism, for example, by fabricating the prism to include the correction. This may be done by grinding the prism, or by mounting the prism on the corrective lens for near vision.

Figure 7:
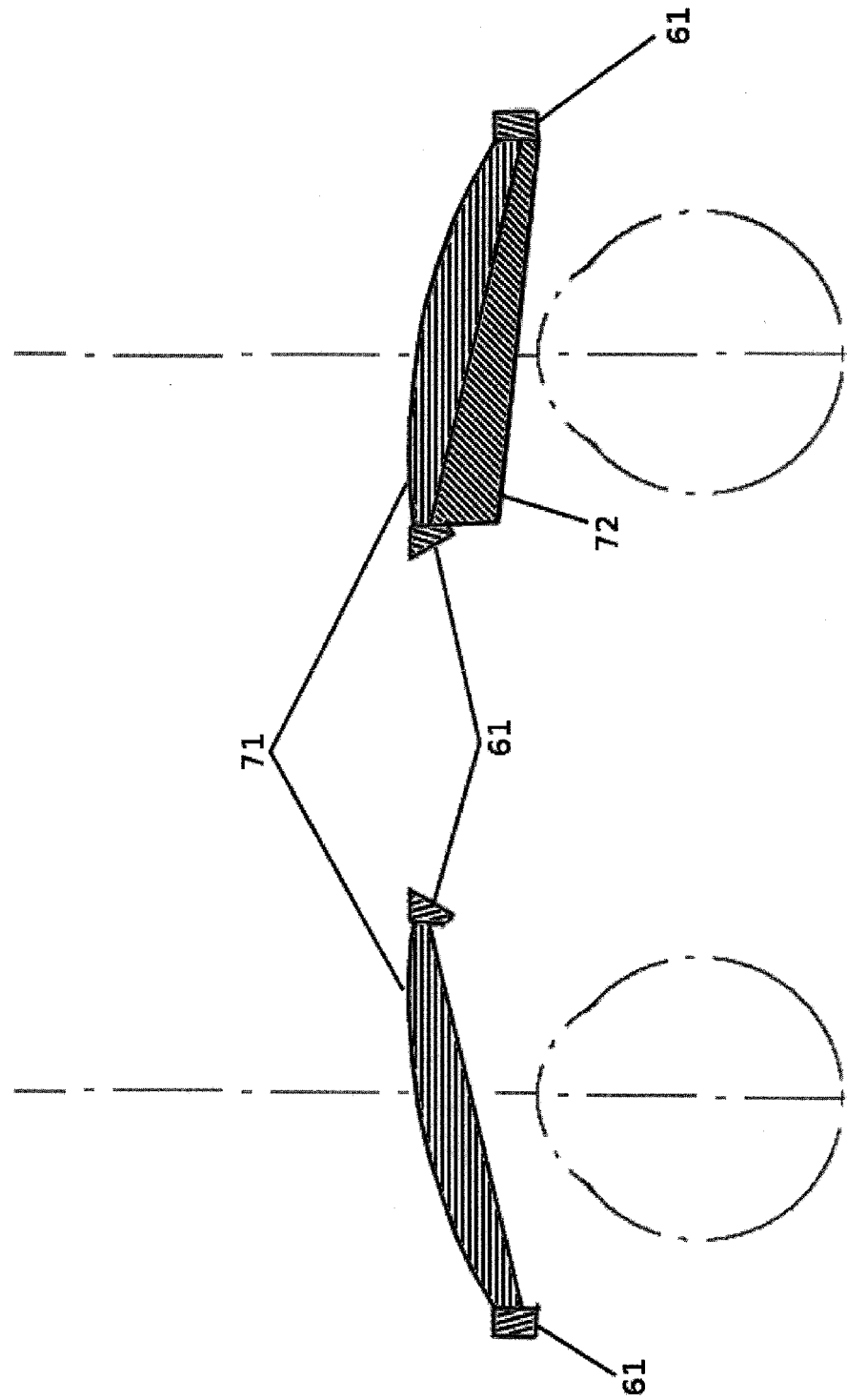
FIG. 7 is a cross-section taken along the lenses of FIG. 1 showing a right eye reading prism.

Example for Left Hemianopsia
+1.00 4 Base In Right Eye BIOD
+1.00 no prism in the eye closest to the visual loss
(This could be reversed but most likely prescribed this way.)
Example for Right Hemianopsia
+2.50 with 6 Base In Left Eye (OS)
+2.50 with no prism in right eye A prescription could be non-power PLANO with only a prism for left hemianopsia. A demonstration temporary prescription might also be the following:
O.D. PLANO 4 Base In Right Eye (BIOD)
O.S. PLANO FIG. 7 shows a variation of the present invention providing reading glasses for individuals with vision loss with plus power and prism for left hemianopsia in right lens and for right hemianopsia prism power in the left lens with base of prism directed inward. FIG. 7 is a cross section view of a reading prescription in a frame 61 that could be soft or hard as drawn. Prism readers are not new to the field of low vision. Prism compensated ½ eyes are a staple of the low vision clinician. They are especially useful when an individual has lost acuity to macular degeneration. However, magnification by increasing plus power of a prism compensated reading ½ eye is counterproductive to an already reduced visual field when vision loss from hemianopsia is present. It is counterproductive because it causes a closer working distance with a smaller usable visual field. In addition, it creates a larger image of the print, which is again counterproductive when the goal needs to be increasing the number of letters able to be seen for reading. FIG. 7 shows a right eye Base In prism 72 with a plus (+) lens 71 of more conventional power. It also shows a left eye plus lens 71 usually but not necessarily of equal power. For the individual with low vision due to macular degeneration and stroke the prism readers are again uniquely different from the prism compensated ½ eyes with this design with increasing power but using a prism design in order to allow the least magnification possible while still allowing for an increase of usable vision for reading when an individual has lost vision due to stroke. Therefore, prism 72 may be used for the individuals with macular degeneration and stroke with stronger high plus (+) power 71 and prism 72 for hemianopsia.

While the invention has been described in detail with particular reference to the preferred embodiments thereof, it will be understood that variations and modifications can be effected within the spirit and scope of the invention as previously described and as defined by the claims.

What is claimed is:

1. A method for preventing or treating visual neglect, visual field loss or motor loss of an individual comprising:
   determining the direction of the field of vision loss for the individual;
   fitting the individual for a first pair of glasses, the first pair of glasses comprising a first prism within a first lens, the first prism having a power within the range of about 8.5 to about 45 diopters and oriented with the prism base toward the direction of the individual's field of vision loss and positioned during fitting to be in the individual's direct line of sight when viewing straight ahead; and
   having the individual wear the first pair of glasses.

2. The method of claim 1 further comprising the steps of:
   fitting the individual for a second pair of glasses, the second pair of glasses having:
   (i) a second prism within a first lens of the second pair of glasses, the first lens of the second pair of glasses being for the same eye as the first lens of the first pair of glasses, the second prism having a power within the range of about 8.5 to about 45 diopters and oriented with the prism base toward the direction of the individual's field of vision loss and positioned during fitting to be in the individual's direct line of sight when viewing straight ahead; and
   (ii) a third prism within the second lens of the second pair of glasses, the third prism having a power that is at least about 4.5 diopters lower than the power of the second prism and oriented with the prism base toward the direction of the individual's field of vision loss and positioned during fitting to be in the individual's direct line of sight when viewing straight ahead;
   determining that the individual's eyes diverge such that the individual's vision will benefit from wearing the second pair of glasses instead of the first pair of glasses; and
   having the individual stop wearing the first pair of glasses and begin wearing the second pair of glasses.

3. The method of claim 2 wherein the power of the second prism is the same as the power of the first prism.

4. The method of claim 1 wherein the power of the first prism is about 18.5 diopters.

5. The method of claim 2 wherein the power of both the first and second prisms is about 18.5 diopters.

6. The method of claim 2 wherein the power of the third prism is about 4.0 diopters.

7. The method of claim 2 further comprising:
   fitting the individual for at least one more successive pairs of glasses, each of the successive pair of glasses having:
   (i) a strong prism in a first lens of the successive pair of glasses for the same eye as the first lens of the first pair of glasses, wherein the strong prism has a power within the range of about 8.5 to about 45 diopters and is oriented with the prism base toward the direction the individual's field of vision loss and positioned during fitting to be in the individual's direct line of sight when viewing straight ahead; and
   (ii) a weak prism in the second lens of each of the successive pair of glasses oriented with the prism base toward the direction of the individual's field of vision loss and positioned during fitting to be in the individual's direct line of sight when viewing straight ahead, wherein the power of the weak prism of each successive pair of glasses is successively stronger but at least 4.5 diopters lower power than the strong prism in the first lens of each successive pair of glasses;
   successively determining that the individual's eyes diverge such that the individual's vision will benefit from changing to the next successive pair of glasses; and
   having the individual stop wearing the current glasses and start wearing the next successive pair of glasses.

8. The method of claim 7 wherein the third prism has a power of about 4.5 diopters and the weak prisms in two successive pairs of glasses are about 8.5 to 10 diopters and about 14 diopters.

9. The method of claim 1 wherein the individual is unconscious in a coma from a stroke or trauma, and wherein the individual is fitted for the first pair of glasses so that the glasses may be placed on the unconscious individual and utilized upon waking.

10. The method of claim 2 wherein the third prism is ground to the full dimension of the lens frame.

11. The method of claim 7 wherein the third prism and the weak prism of each successive pair of glasses are ground to the full dimension of the lens frame.

12. The method of claim 1 wherein the first lens is for the eye farthest away from the individual's field of vision loss.

13. A method for preventing or treating visual neglect, visual field loss or motor loss of an individual comprising:
   determining the direction of the field of vision loss for the individual;
   fitting the individual for a first pair of glasses, the first pair of glasses having a first prism within the lens farthest from the individual's field of vision loss, the prism having a first power within the range of about 8.5 to about 45 diopters and oriented with the prism base inward toward the nose of the individual and positioned during fitting to be in the individual's direct line of sight when viewing straight ahead; and
   having the individual wear the first pair of glasses.

14. The method of claim 13 further comprising the steps of:
   fitting the individual for a second pair of glasses, the second pair of glasses having:
   (i) a second prism within the lens farthest from the individual's field of vision loss, the second prism having a second power within the range of about 8.5 to about 45 diopters and oriented with the prism base inward toward the nose of the individual and positioned during fitting to be in the individual's direct line of sight when viewing straight ahead; and
   (ii) a third prism within the lens closest to the individual's field of vision loss, the third prism having a third power that is at least about 4.5 diopters lower than the second power of the second prism, the third prism being oriented with the prism base outward from the nose of the individual and positioned during fitting to be in the individual's direct line of sight when viewing straight ahead;
   determining that the individual's eyes diverge such that the individual's vision will benefit from wearing the second pair of glasses instead of the first pair of glasses; and
   having the individual stop wearing the first pair of glasses and begin wearing the second pair of glasses.

15. The method of claim 13 wherein the first power of the first prism is about 18.5 diopters.

16. The method of claim 14 wherein the second power of the second prism is the same as the first power of the first prism.

17. The method of claim 16 wherein the power of both the first and second prisms is about 18.5 diopters.

18. The method of claim 14 further comprising:
   fitting the individual for at least one more successive pairs of glasses, each of the successive pair of glasses having:
   (i) a prism in the lens farthest from the individual's field of vision loss wherein the power of the prism is the same as the power of the first prism located in the first pair of glasses and oriented base inward toward the nose of the individual and positioned during fitting to be in the individual's direct line of sight when viewing straight ahead; and
   (ii) a prism in the opposite second lens of each said successive pair of glasses oriented base outward from the individual's nose and positioned during fitting to be in the individual's direct line of sight when viewing straight ahead, wherein the power of the prism in the opposite second lens of each successive pair of glasses is successively stronger but at least 4.5 diopters lower power than the prism in the lens farthest from the individual's field of vision loss;
   successively determining that the individual's eyes diverge such that the individual's vision will benefit from wearing the next successive pair of glases; and
   having the individual wear each successive pair of glasses with a stronger power prism in the second lens than the previously worn glasses after wearing the previous pair of glasses.

19. A method for preventing or treating visual neglect, visual field loss or motor loss of an individual comprising:
   determining the direction of the field of vision loss for the individual;
   fitting the individual for a first pair of glasses, the first pair of glasses having a first prism within the lens farthest from the individual's field of vision loss, the prism having a first power within the range of about 8.5 to about 45 diopters and oriented with the prism base inward toward the nose of the individual and positioned during fitting to be in the individual's direct line of sight when viewing straight ahead;
   having the individual wear the first pair of glasses;
   fitting the individual for at least one more successive pairs of glasses, each of the successive pair of glasses having:
   (i) a prism in the lens farthest from the individual's field of vision loss wherein the power of the prism is the same as the power of the first prism located in the first pair of glasses and oriented base inward toward the nose of the individual and positioned during fitting to be in the individual's direct line of sight when viewing straight ahead; and
   (ii) a prism in the opposite second lens of each said successive pair of glasses oriented with the prism base outward away from the individual's nose and positioned during fitting to be in the individual's direct line of sight when viewing straight ahead, wherein the power of the prism in the opposite second lens of each successive pair of glasses is successively stronger but at least 4.5 diopters lower power than the prism in the lens farthest from the individual's field of vision loss;
   successively determining that the individual's eyes diverge such that the individual's vision will benefit from wearing the next successive pair of glases; and
   having the individual wear each successive pair of glasses with a stronger power prism in said second lens than the previously worn glasses after wearing the previous pair of glasses.

20. The method of claim 19 wherein the power of the prism in the lens farthest from the individual's field of vision loss is about 18.5 diopters, and wherein the power of the prism in the second lens of at least three successive pairs of glasses are about 4.5 diopters, about 8.5 to 10 diopters, and about 14 diopters.

* * * * *